(12) United States Patent
Kubota et al.

(10) Patent No.: US 7,883,423 B2
(45) Date of Patent: Feb. 8, 2011

(54) SHAFT COUPLING MECHANISM FOR ELECTRIC POWER STEERING APPARATUS

(75) Inventors: Shuichi Kubota, Kanagawa (JP); Takashi Horiguchi, Kanagawa (JP); Katsunori Saito, Kanagawa (JP); Toshio Iida, Osaka (JP); Yoshifumi Obata, Osaka (JP)

(73) Assignee: Oiles Corporation, Tokyo (JP)

( * ) Notice: Subject to any disclaimer, the term of this patent is extended or adjusted under 35 U.S.C. 154(b) by 169 days.

(21) Appl. No.: 11/793,727

(22) PCT Filed: Dec. 15, 2005

(86) PCT No.: PCT/JP2005/023082

§ 371 (c)(1),
(2), (4) Date: Jul. 17, 2007

(87) PCT Pub. No.: WO2006/068032

PCT Pub. Date: Jun. 29, 2006

(65) Prior Publication Data

US 2008/0035414 A1    Feb. 14, 2008

(30) Foreign Application Priority Data

Dec. 24, 2004    (JP) .............................. 2004-373756

(51) Int. Cl.
*F16D 3/58* (2006.01)

(52) U.S. Cl. ....................................................... 464/73

(58) Field of Classification Search .................... 464/73, 464/149, 157; 180/444
See application file for complete search history.

(56) References Cited

U.S. PATENT DOCUMENTS 2,074,941 A * 3/1937 Ricefield ...................... 464/73
3,396,556 A * 8/1968 Giegerich ..................... 464/73

FOREIGN PATENT DOCUMENTS

| JP | 45-4409 | 2/1970 |
| JP | 58-211022 | 12/1983 |
| JP | 2004-148990 | 5/2004 |
| JP | 2004-149070 | 5/2004 |
| JP | 2004-251426 | 9/2004 |
| SU | 706603 A * | 12/1979 | .................. 464/73 |
| WO | 98/32985 | 7/1998 |
| WO | WO 99/65758 | 12/1999 |

OTHER PUBLICATIONS

International Search Report mailed Mar. 20, 2006.

* cited by examiner

*Primary Examiner*—Greg Binda
(74) *Attorney, Agent, or Firm*—Nixon & Vanderhye P.C.

(57) ABSTRACT

A shaft coupling mechanism for an electric power steering apparatus includes a coupling base body coupled to a rotating shaft; a coupling base body coupled to a steering shaft serving as a rotating shaft; and a rotation transmitting member which is disposed between the both coupling base bodies and transmits the rotation of the coupling base body in a direction about the axis, i.e., in an R direction, to the coupling base body as rotation in the R direction.

5 Claims, 3 Drawing Sheets

[Fig. 1]
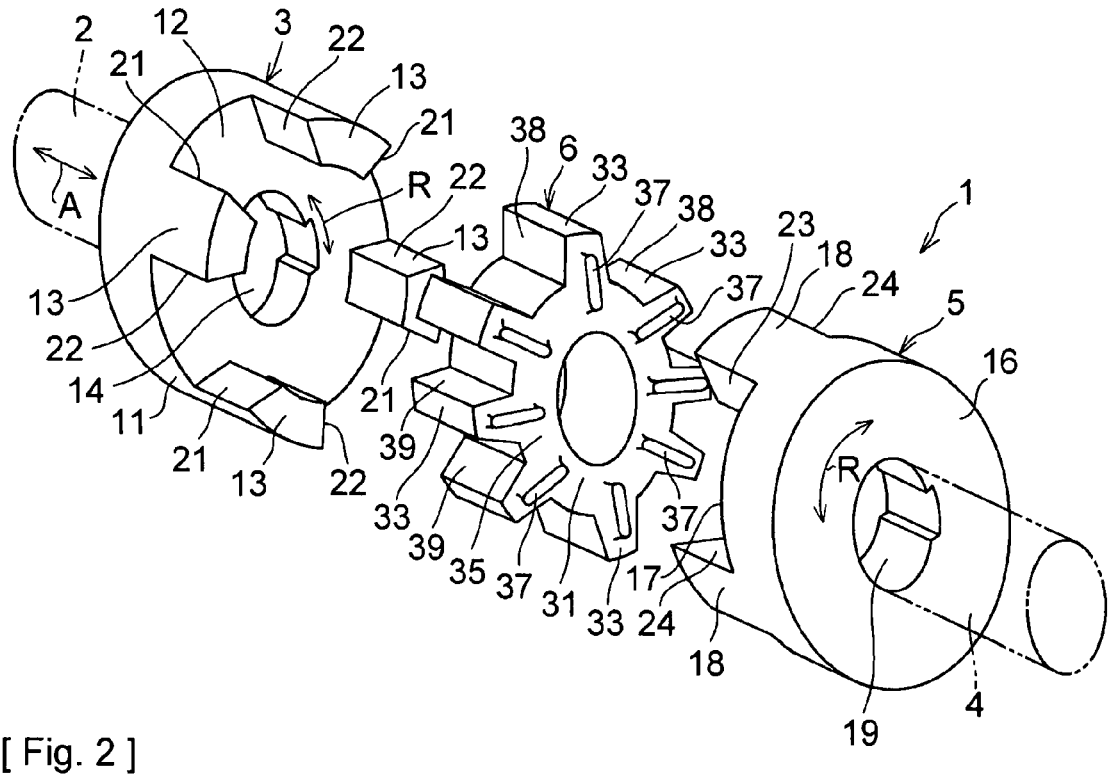
[Fig. 2]
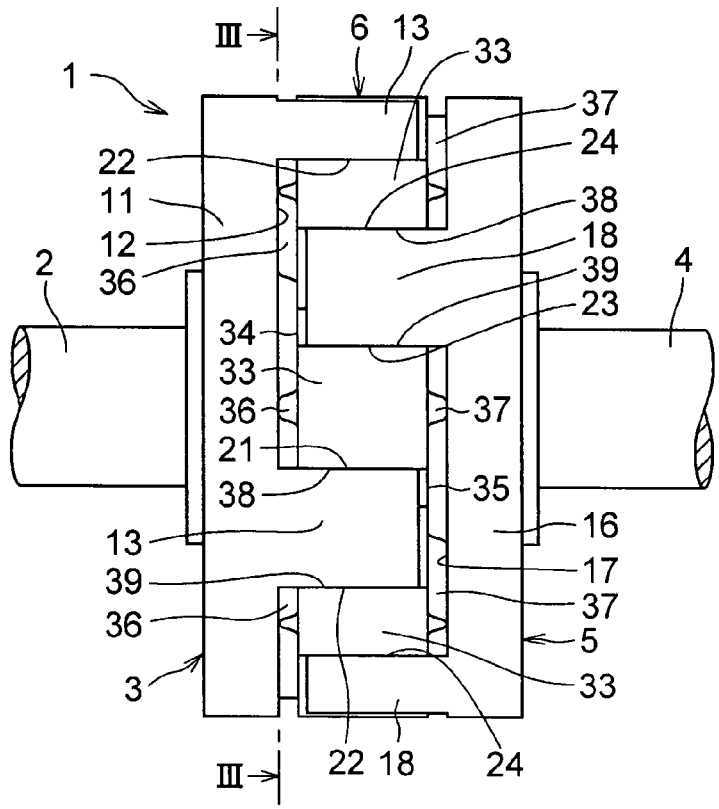

[ Fig. 3 ]
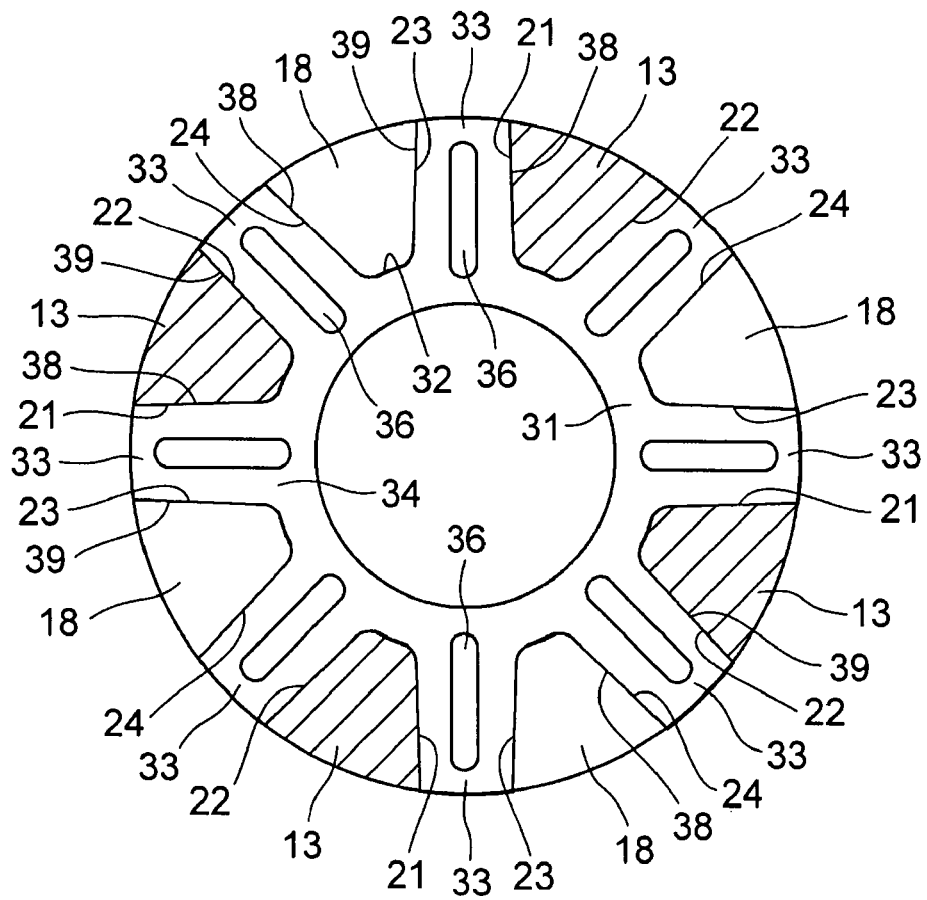
[ Fig. 4 ]
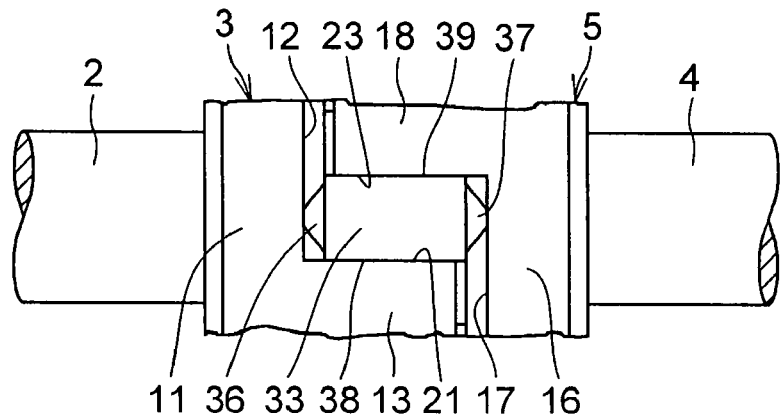

[Fig. 5]
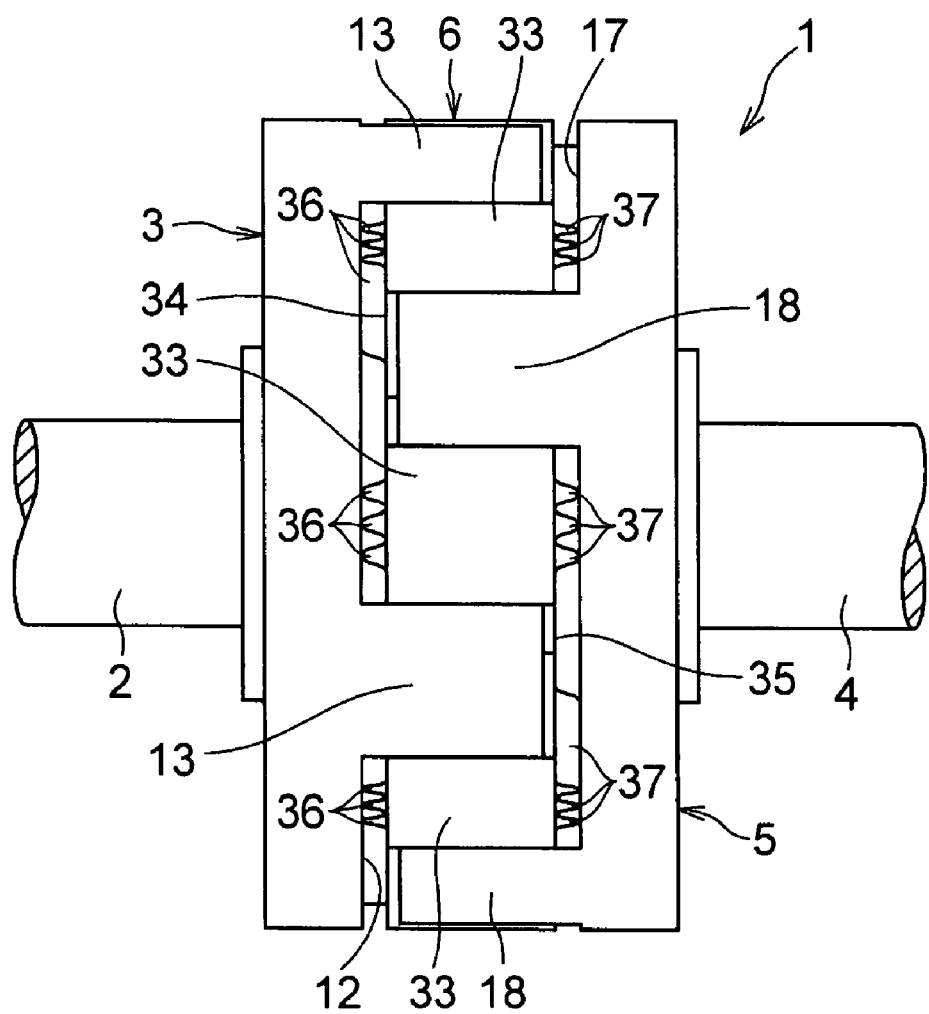

US 7,883,423 B2

SHAFT COUPLING MECHANISM FOR ELECTRIC POWER STEERING APPARATUS

This application is the U.S. national phase of International Application No. PCT/JP2005/023082 filed 15 Dec. 2005 which designated the U.S. and claims priority to JP 2004-373756 filed 24 Dec. 2004, the entire contents of each of which are hereby incorporated by reference.

Technical Field

The present invention relates to a shaft coupling mechanism suitable for coupling a rotating shaft on a rotating source side such as an electric motor in an electric power steering apparatus and a rotating shaft on an operating side such as a steering shaft of an automobile.

Background Art

Patent document 1: JP-A-2002-518242
Patent document 2: JP-A-2004-148990
Patent document 3: JP-A-2004-149070

An electric power steering apparatus is for facilitating the manual steering of a steering wheel by adding a torque based on the rotation of an output rotating shaft of an electric motor to a torque based on the rotation of the steering wheel which is manually operated. In such an electric power steering apparatus, the steering shaft on the steering wheel side and the rotating shaft on the output rotating shaft side of the electric motor are coupled by means of a shaft coupling mechanism (a coupling).

In the case where the steering shaft and the rotating shaft are coupled by means of the shaft coupling mechanism, there is a possibility that an impact at the time of the reversing of the output rotating shaft of the electric motor and the vibration of the brushes of the electric motor are transmitted to the steering wheel through the shaft coupling mechanism and the steering shaft, thereby causing an unpleasant steering feel to the driver. To avoid this, it has been proposed to provide a spacer made of such as rubber or soft resin for the shaft coupling mechanism.

DISCLOSURE OF THE INVENTION

Problems to be Solved by the Invention

If the spacer is made softer by placing emphasis on the reduction of the impact and vibration, since the soft spacer is likely to undergo creep deformation, backlash can occur in the shaft coupling mechanism owing to the permanent deformation of the spacer due to the repeated load on the spacer. There is a possibility that this can also make the driver's steering feel unpleasant.

On the other hand, if the spacer is made hard by placing emphasis on the durability, the steering feel improves contrary to the above since there is no backlash. However, the steering feel becomes uncomfortable due to the impact and vibration transmitted to the steering wheel, as described above.

The present invention has been devised in view of the above-described circumstances, and its object is to provide a shaft coupling mechanism for an electric power steering apparatus in which backlash in a direction about an axis is difficult to occur between one rotating shaft, e.g., a rotating shaft coupled to the output rotating shaft of the electric motor, and another rotating shaft, e.g., the steering shaft coupled to the steering wheel, which makes it possible to reduce the transmission to the steering wheel of the impact at the time of the reversing of the electric motor and the brush vibration, and which hence excels in durability and prevents the steering feel from becoming uncomfortable.

Means for Solving the Problems

A shaft coupling mechanism in accordance with the invention for coupling two rotating shafts by being disposed between the two rotating shafts so as to transmit the rotation of one rotating shaft to the other rotating shaft, comprises: one coupling base body coupled to the one rotating shaft; another coupling base body coupled to the other rotating shaft; and a rotation transmitting member disposed between the one and the other coupling base bodies to transmit the rotation of the one coupling base body in a direction about an axis to the other coupling base body, wherein each of the one and the other coupling base bodies has a base portion and a projecting portion projecting integrally in an axial direction from this base portion, and the rotation transmitting member has at least one pair of projecting portions spaced apart from each other in the direction about the axis and extending in a radial direction and a projection provided integrally on at least each of this pair of projecting portions and adapted to come into contact with the base portion of the one or the other coupling base body, the projecting portion of the one coupling base body being disposed in one projecting portion gap between the pair of projecting portions in the direction about the axis, the projecting portion of the other coupling base body being disposed in another projecting portion gap between the pair of projecting portions in the direction about the axis, the rotation transmitting member at least at its projecting portions having a smaller rigidity than the projecting portions of the one and the other coupling base bodies and being elastically deformable in the direction about the axis.

According to the shaft coupling mechanism in accordance with the invention, in the rotation transmitting member which is disposed between the one and the other coupling base bodies and which has a smaller rigidity than the one and the other coupling base bodies and is elastically deformable, the projection provided integrally on each of its pair of projecting portions is adapted to come into contact with the base portion of the one or the other coupling base body. As a result, the compressive deformation of the pair of projecting portions of the rotation transmitting member in the direction about the axis is suppressed by the contact of the projections against the base portion of the coupling base body. Therefore, it is possible to prevent the repeated large compressive deformation of the pair of projecting portions in the direction about the axis, and reduce the permanent deformation of the pair of projecting portions of the rotation transmitting member due to creep. Thus, it is possible to reduce the transmission to the steering wheel of the impact at the time of the reversing of the electric motor and the brush vibration, and it is possible to eliminate backlash in the rotating direction between the two rotating shafts. Hence, the steering feel can be prevented from becoming uncomfortable, and the shaft coupling mechanism can be made to excel in durability and exhibiting stable characteristics.

In the present invention, the rotation transmitting member which functions as a spacer is sufficient if it is formed of a rubber elastic body such as urethane rubber or polyester elastomer, but it may be formed of another elastic body.

In a preferred example of the present invention, the rotation transmitting member has an annular base portion, and the projecting portions of the rotation transmitting member are provided integrally on the base portion in such a manner as to extend in the radial direction from an outer peripheral edge of the base portion of the rotation transmitting member, each of the projections being provided in such a manner as to extend in the radial direction and across both the base portion and the projecting portion of the rotation transmitting member. If such projections are used, it is possible to suppress the compressive deformation of the substantially entire rotation transmitting member in the direction about the axis. Therefore, it is possible to more effectively prevent the repeated large compressive deformation of the projecting portions of the rotation transmitting member in the direction about the axis, and more substantially reduce the permanent deformation of the rotation transmitting member due to creep.

Preferably, the projection is provided on each axial surface of the projecting portion of the rotation transmitting member. In this case, the projection provided on one axial surface of the projecting portion of the rotation transmitting member may be adapted to come into contact with the base portion of the one coupling base body, and the projection provided on the other axial surface of the projecting portion of the rotation transmitting member may be adapted to come into contact with the base portion of the other coupling base body. In the case where the projection is provided on each axial surface of the respective projecting portion of the rotation transmitting member, it is possible to make the projection low, and it is possible to suppress the compressive deformation of the projecting portions of the rotation transmitting member in both of the axial direction. Therefore, it is possible to prevent a warped compressive deformation of the projecting portions of the rotation transmitting member.

The projections may be adapted not to come into contact with the base portion of the one or the other coupling base body before the projecting portions of the rotation transmitting member are compressively deformed in the direction about the axis, while the projections may be adapted to come into contact with the base portion of the one or the other coupling base body after the projecting portions of the rotation transmitting member are compressively deformed in the direction about the axis. Alternatively, the projections may be adapted to come into contact with the base portion of the one or the other coupling base body before and after the projecting portions of the rotation transmitting member are compressively deformed in the direction about the axis.

A single projection may be used as the projection provided on each of the projecting portions of the rotation transmitting member, but a plurality of projections may be provided thereon. In the case of the plurality of projections, it is possible to more effectively suppress the compressive deformation of the projecting portions of the rotation transmitting member in the direction about the axis. The projection may be an elongated projection extending the radial direction, but may alternatively be shaped in the form of a cylinder or a truncated cone.

In a preferred example, each of the projecting portions of the one and the other coupling base bodies at its side surfaces in the direction about the axis is in contact with a side surface in the direction about the axis of each of the projecting portions of the rotation transmitting member opposing the same in the direction about the axis. In such a case, it is possible to ensure that play does not occur in the relative initial rotation of the one rotating shaft with respect to the other rotating shaft.

The one coupling base body may be secured by being directly coupled to the one rotating shaft, but may be indirectly coupled to the one rotating shaft through another rotation transmitting mechanism such as a gear mechanism. The same applies to the other coupling base body.

The shaft coupling mechanism may be a shaft coupling mechanism for an electric power steering apparatus. In this case, the one rotating shaft may be adapted to be coupled to an output rotating shaft of an electric motor, while the other rotating shaft may be adapted to be coupled to a steering shaft of an automobile.

Advantageous Effect of the Invention

According to the present invention, it is possible to provide a shaft coupling mechanism for an electric power steering apparatus in which backlash in the direction about the axis is difficult to occur between one rotating shaft, e.g., a rotating shaft coupled to the output rotating shaft of the electric motor, and another rotating shaft, e.g., the steering shaft coupled to the steering wheel, which makes it possible to reduce the transmission to the steering wheel of the impact at the time of the reversing of the electric motor and the brush vibration, and which hence excels in durability and prevents the steering feel from becoming uncomfortable.

Next, a more detailed description will be given of the mode for carrying out the invention on the basis of preferred embodiments illustrated in the drawings. It should be noted that the present invention is not limited to these embodiments.

BRIEF DESCRIPTION OF THE DRAWINGS

FIG. 1 is an exploded perspective view of a preferred embodiment of the invention;

FIG. 2 is a front elevational view of an assembled state of the embodiment shown in FIG. 1;

FIG. 3 is a cross-sectional view taken in the direction of arrows along line III-III shown in FIG. 2;

FIG. 4 is a diagram explaining the operation of the embodiment shown in FIG. 1; and FIG. 5 is a front elevational view of another preferred embodiment of the present invention.

BEST MODE FOR CARRYING OUT THE INVENTION

In FIGS. 1 to 3, a shaft coupling mechanism 1 for an electric power steering apparatus in accordance with this embodiment is comprised of a coupling base body 3 coupled to a rotating shaft 2; a coupling base body 5 coupled to a steering shaft 4 serving as a rotating shaft; and a rotation transmitting member 6 which is disposed between the both coupling base bodies 3 and 5 and transmits the rotation of the coupling base body 3 in a direction about the axis, i.e., in an R direction, to the coupling base body 5 as rotation in the R direction.

The rotating shaft 2 is a rotating shaft on an electric motor side of the electric power steering apparatus. The coupling base body 3 which is rigid includes an annular base portion 11; two pairs of projecting portions 13 projecting integrally from one annular surface 12 of the base portion 11 in an axial direction, i.e., in an A direction, and arranged at equiangular intervals of 90° in the direction about the axis, i.e., in the R direction; and a through hole 14 in which the rotating shaft 2 is fitted and secured therein. The coupling base body 5 which is rigid and has the same structure as the coupling body 3 includes an annular base portion 16 disposed concentrically with the base portion 11; two pairs of projecting portions 18 projecting integrally from one annular surface 17 of the base portion 16 in the A direction and arranged at equiangular intervals of 90° in the R direction; and a through hole 19 in which the steering shaft 4 is fitted and secured therein. The coupling base body 5 is thus formed identically to the coupling base body 3.

Each of the projecting portions 13 has in the R direction a pair of side surfaces 21 and 22 serving as rotation transmitting rigid surfaces, and each of the projecting portions 18 also has in the R direction a pair of side surfaces 23 and 24 serving as rotation transmitting rigid surfaces.

The rotation transmitting member 6 has a smaller rigidity than the coupling base bodies 3 and 5, is elastically deformable, and is formed of a rubber elastic body such as urethane rubber or polyester elastomer. The rotation transmitting member 6 includes an annular base portion 31 disposed concentrically with the base portions 11 and 16; four pairs of projecting portions 33 which are provided integrally with the base portion 31 in such a manner as to extend radially from a cylindrical outer peripheral edge 32 of the base portion 31 and are disposed in such a manner as to be spaced apart from each other at equiangular intervals of 45° in the R direction; and projections 36 and 37 which are integrally provided on respective surfaces 34 and 35 in the A direction of the base portion 31 and the projecting portions 33 facing the annular surfaces 12 and 17 in the A direction, and which are adapted to come into contact with the annular surfaces 12 and 17 of the base portions 11 and 16.

Each of the projecting portions 33 has side surfaces 38 and 39 in the R direction. The projections 36, which are each provided on the one surface 34 in the A direction of the rotation transmitting member 6 in such a manner as to extend in the radial direction and across both the base portion 31 and the projecting portion 33, are in contact with the annular surface 12 of the base portion 11. Meanwhile, the projections 37, which are each provided on the other surface 35 in the A direction of the rotation transmitting member 6 in such a manner as to extend in the radial direction and across both the base portion 31 and the projecting portion 33, are in contact with the annular surface 17 of the base portion 16.

Each of the projecting portions 13 of the coupling base body 3 is disposed between one projecting portions 33 of the respective pairs of projecting portions 33 of the rotation transmitting member 6, i.e., between alternate ones of the projecting portions 33, in the R direction. Each of the projecting portions 18 of the coupling base body 5 is disposed between the other projecting portions 33 of the respective pairs of projecting portions 33 of the rotation transmitting member 6, i.e., between the remaining alternate ones of the projecting portions 33, in the R direction. Each of the projecting portions 13 of the coupling base body 3 at its side surfaces 21 and 22 in the R direction is in contact with each of the side surfaces 3 8 and 39 in the R direction of the projecting portions 33 of the rotation transmitting member 6 opposing the same in the R direction.

With the electric power steering apparatus equipped with the above-described shaft coupling mechanism 1 for mutually coupling the rotating shaft 2 and the steering shaft 4, which are two rotating shafts, when the steering wheel is manually operated by the driver, the steering shaft 4 is rotated in the R direction, and the rotation of the steering shaft 4 in the R direction is transmitted to a drag link and the like as reciprocating motion through an unillustrated transmission mechanism such as gears, thereby imparting a steering force for steering wheels (wheels). In the manual operation of the steering wheel by the driver, when the electric motor which is controlled by a detection signal from a torque detector for detecting the torque applied to the steering wheel is operated, the rotating shaft 2 is rotated in the R direction. The rotation of the coupling base body 3 in the R direction is then transmitted to the projecting portions 18 of the coupling base body 5 as the rotation in the R direction through the compressive deformation of the projecting portions 33 in the R direction due to the projecting portions 13. As a result, the torque of the rotating shaft 2 in the R direction is added to the torque of the steering shaft 4 in the R direction, thereby assisting the manual operation of the steering wheel by the driver.

With the shaft coupling mechanism 1, in both the state in which the steering wheel is not manually operated by the driver and the steering shaft 4 is not rotated in the R direction and the state in which the steering wheel is manually operated by the driver and the steering shaft 4 is rotated in the R direction, in a case where the relative rotation of the rotating shaft 2 in the R direction with respect to the steering shaft 4 is very small, the projecting portions 33 easily undergo compressive deformation. As a result, such a very small relative rotation of the rotating shaft 2 in the R direction is almost not transmitted to the steering shaft 4. Thus, it is possible to reduce the transmission to the steering wheel of the impact at the time of the reversing of the electric motor and the brush vibration through the shaft coupling mechanism 1 and the steering shaft 4, thereby making it possible to prevent the steering feel from becoming uncomfortable. Furthermore, as a result of the fact that the projections 36 and 37 provided integrally on the respective projecting portions 33 are adapted to come into contact with the respective annular surfaces 12 and 17 of the base portions 11 and 16, the compressive deformation of the projecting portions 33 of the rotation transmitting member 6 in the R direction is suppressed by the contact with the annular surfaces 12 and 17 of the base portions 11 and 16 accompanied by the collapse of the respective projections 36 and 37, as shown in FIG. 4. Therefore, it is possible to prevent the repeated large compressive deformation of the projecting portions 33 in the R direction. Thus, it is possible to reduce the permanent deformation of the rotation transmitting member 6 including the projecting portions 33 due to creep, thereby making it possible to obtain a shaft coupling mechanism excelling in durability and exhibiting stable characteristics.

Although the shaft coupling mechanism 1 of the above-described embodiment is comprised of a single rotation transmitting member 6, the shaft coupling mechanism may alternatively be comprised of two or more rotation transmitting members 6 superposed one on top of another. In addition, the projecting portions 13 and 18 of the coupling base bodies 3 and 5 and the projecting portions 33 of the rotation transmitting member 6 are not limited to the above-described numbers. The numbers of the projecting portions 13 and 18 of the coupling base bodies 3 and 5 may respectively be at least one, and the number of the projecting portions 33 of the rotation transmitting member 6 may be at least two.

In addition, the respective projections 36 and 37 may be adapted to come into contact with the respective annular surfaces 12 and 17 of the base portions 11 and 16 before and after the projecting portions 33 of the rotation transmitting member 6 are compressively deformed in the R direction, as described above. Alternatively, however, the projections 36 and 37 may be adapted not to come into contact with the respective annular surfaces 12 and 17 of the base portions 11 and 16 before the projecting portions 33 of the rotation transmitting member 6 are compressively deformed in the R direction, while the projections 36 and 37 may be adapted to come into contact with the respective annular surfaces 12 and 17 of the base portions 11 and 16 after the projecting portions 33 of the rotation transmitting member 6 are compressively deformed in the R direction. Furthermore, instead of providing the projections 36 and 37 on all the projecting portions 33, the projections 36 and 37 may be provided on every other projecting portion 33, in which case, the projecting portion 33 on which the projection 36 is provided and the projecting portion 33 on which the projection 37 is provided may be made different. In addition, the plurality of projections 36 and 37 may be provided integrally on the respective surfaces 34 and 35 of the base portion 31 and each projecting portion 33, as shown in FIG. 5.

The invention claimed is:

1. A shaft coupling mechanism for coupling two rotating shafts by being disposed between the two rotating shafts so as to transmit the rotation of one rotating shaft to the other rotating shaft, comprising:

one coupling base body coupled to the one rotating shaft;

another coupling base body coupled to the other rotating shaft; and a rotation transmitting member disposed between said one and said other coupling base bodies to transmit the rotation of said one coupling base body in a direction about an axis to said other coupling base body, wherein each of said one and said other coupling base bodies has a coupling base portion and an axial projecting portion provided integrally on and projecting in an axial direction from the coupling base portion, and said rotation transmitting member has an annular base portion disposed concentrically with the coupling base portions and having a central hole, at least first and second radial projecting portions spaced apart from each other in the direction about the axis and provided integrally on and extending in a radial direction from a cylindrical outer peripheral edge of the annular base portion, and a first projection provided integrally on and projecting in the axial direction from one axial surface of the annular base portion and the first radial projecting portion so as to extend in the radial direction and across both the annular base portion and the first radial projecting portion, the first projection being adapted to come into contact with the coupling base portion of said one coupling base body, a second projection provided integrally on and projecting in the axial direction from one axial surface of the annular base portion and the second radial projecting portion so as to extend in the radial direction and across both the annular base portion and the second radial projecting portion, said second projection being adapted to come into contact with the coupling base portion of said one coupling base body, a third projection provided integrally on and projecting in the axial direction from the other axial surface of the annular base portion and the first radial projecting portion so as to extend in the radial direction and across both the annular base portion and the first radial projecting portion, said third projection being adapted to come into contact with the coupling base portion of said other coupling base body, a fourth projection provided integrally on and projecting in the axial direction from the other axial surface of the annular base portion and the second radial projecting portion so as to extend in the radial direction and across both the annular base portion and the second radial projecting portion, said fourth projection being adapted to come into contact with the coupling base portion of said other coupling base body, the axial projecting portion of said one coupling base body being disposed in one projecting portion gap between the radial projecting portions in the direction about the axis, the axial projecting portion of said other coupling base body being disposed in another projecting portion gap between the radial projecting portions in the direction about the axis, said rotation transmitting member at least at its radial projecting portions having a smaller rigidity than the axial projecting portions of said one and said other coupling base bodies and being elastically deformable in the direction about the axis, the first and second projections each being individually terminated at the radial inner one end thereof on an outer annular periphery portion of the one axial surface of the annular base portion, the third and fourth projections each being individually terminated at a radial inner one end thereof on an outer annular periphery portion of the other axial surface of the annular base portion, thereby the radial inner one ends of the first and second projections being separated from each other, and the radial inner one ends of the third and fourth projections being separated from each other, the first to fourth projections being adapted to individually suppress a compressive deformation of the corresponding radial projecting portion in the direction about the axis by the individual collapse thereof due to contact with the corresponding coupling base portion.

2. The shaft coupling mechanism according to claim 1, wherein the first to fourth projections are adapted to come into contact with the coupling base portions of said one and said other coupling base bodies, respectively, before and after the first and second radial projecting portions of said rotation transmitting member are compressively deformed in the direction about the axis.

3. The shaft coupling mechanism according to claim 1, wherein a plurality of projections are provided integrally on each of the first and second radial projecting portions of the rotation transmitting member.

4. The shaft coupling mechanism according to claim 1, wherein each of the axial projecting portions of said one and said other coupling base bodies at its side surfaces in the direction about the axis is in contact with a side surface in the direction about the axis of each of the first and second radial projecting portions of said rotation transmitting member opposing the same in the direction about the axis.

5. The shaft coupling mechanism according to claim 1, wherein said shaft coupling mechanism is a shaft coupling mechanism for an electric power steering apparatus, and the one rotating shaft is adapted to be coupled to an output rotating shaft of an electric motor, while the other rotating shaft is adapted to be coupled to a steering shaft of an automobile.

* * * * *